Oct. 14, 1969  P. AMERIO  3,472,041
ROTARY DRUM FREEZER
Filed Nov. 13, 1967  2 Sheets-Sheet 1
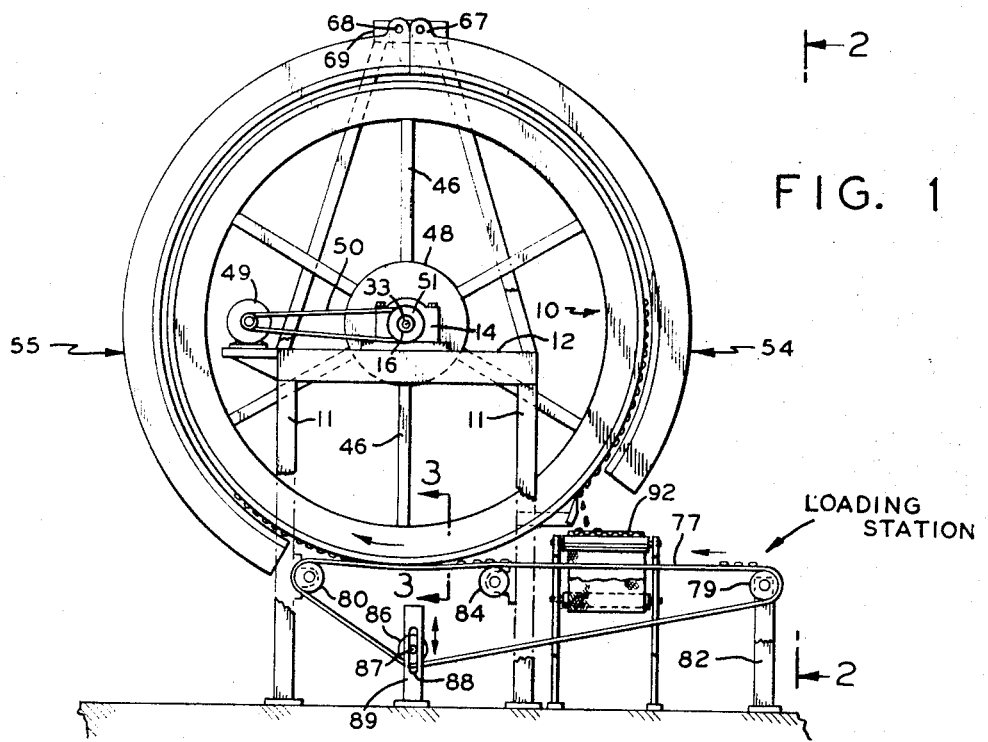
FIG. 1
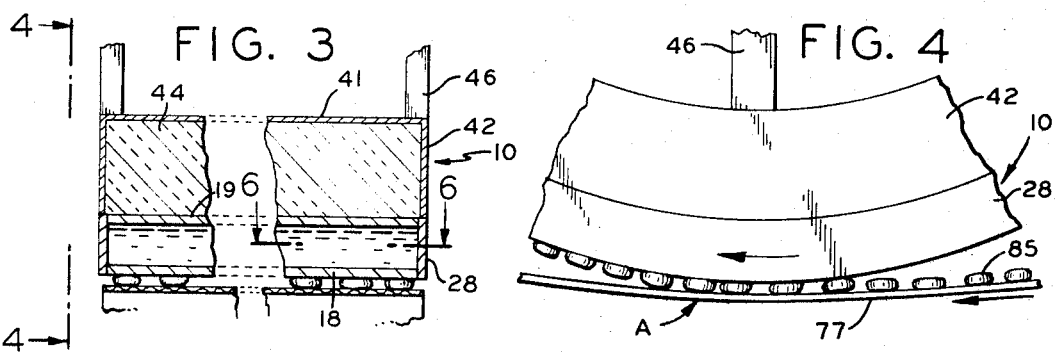
FIG. 3
FIG. 4
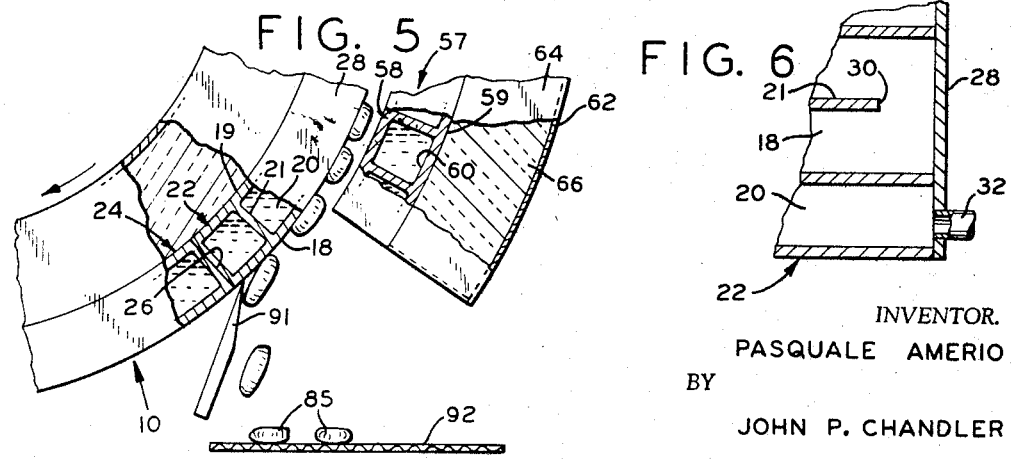
FIG. 5
FIG. 6
INVENTOR.
PASQUALE AMERIO
BY
JOHN P. CHANDLER
HIS ATTORNEY.

Oct. 14, 1969  P. AMERIO  3,472,041
ROTARY DRUM FREEZER
Filed Nov. 13, 1967  2 Sheets-Sheet 2
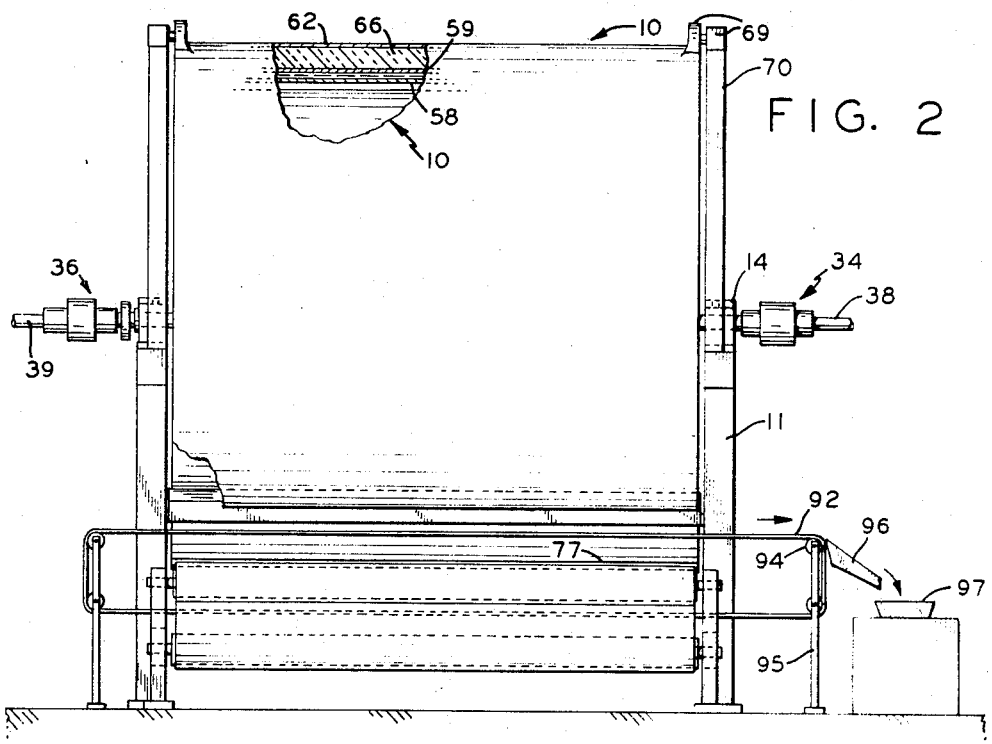
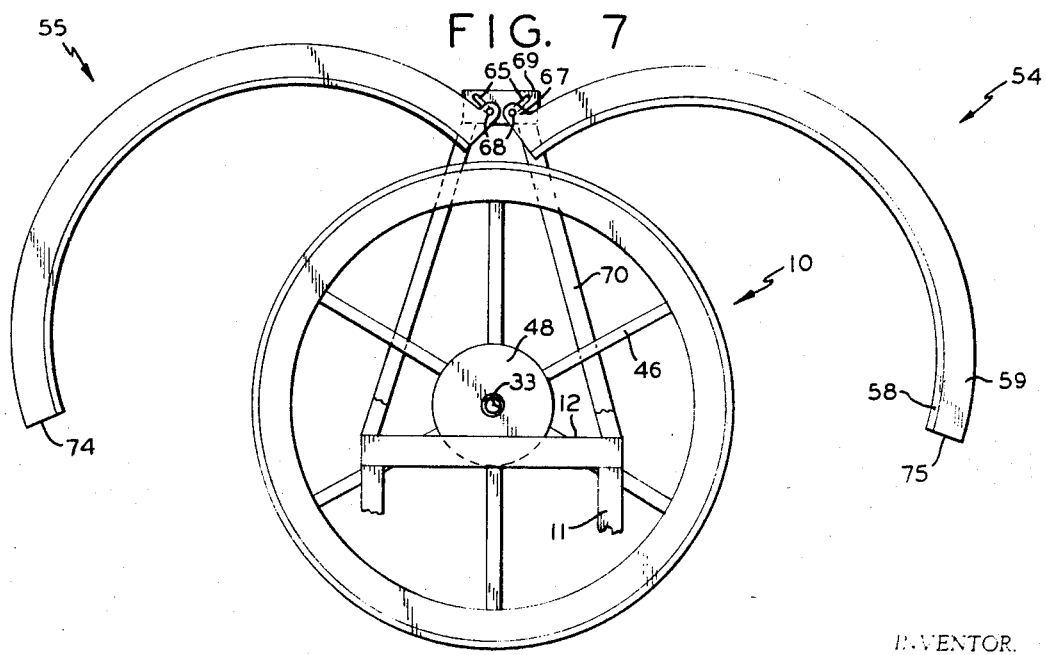
INVENTOR.
PASQUALE AMERIO
BY
JOHN P. CHANDLER
HIS ATTORNEY.

United States Patent Office 3,472,041
Patented Oct. 14, 1969

3,472,041
ROTARY DRUM FREEZER
Pasquale Amerio, Ringwood, N.J., assignor, by mesne assignments, to St. Regis Paper Company, New York, N.Y., a corporation of New York
Filed Nov. 13, 1967, Ser. No. 682,413
Int. Cl. F28g 1/08; F25d 25/04; F28d 11/02
U.S. Cl. 62—303                                7 Claims

ABSTRACT OF THE DISCLOSURE

Rotary food freezing drum formed from hollow arcuate metal sections joined together to form the drum and having a continuous passage therein for a fluid refrigerant, a conveyor belt below the drum for feeding said article thereto and provided with a concave freezing assembly spaced from the outer peripheral face of the drum.

---

This invention relates to drum freezers for unpackaged solid food and relates more particularly to quick freezing apparatus wherein the articles of food are adhered to an internally refrigerated revolving drum and are subjected additionally to the freezing action of an externally refrigerated chamber which encircles the drum in closely spaced relation. In this fashion, the articles of food, such as shrimp, scallops, oysters, meat patties and the like, passing through a circular freezing chamber, are subjected to sharp freezing action and are thoroughly frozen during one pass or revolution through the chamber.

An important object of the present invention is to form an improved internally refrigerated drum in arcuate sections of extruded members formed from any suitable metal such as aluminum. A plurality of these arcuate sections, each with interconnected passages for a fluid refrigerant are welded together to form an integral drum unit which is particularly efficient from a refrigerating point of view and which has a smooth, true outer cylindrical surface to which the shrimps or other foods are easily adhered and from which they can be freed at the end of the rotational cycle by a scraper or doctor blade. By forming the drum as a substantially perfect circle, removal of the frozen shrimp will be facilitated.

Another object of the invention is to provide a second refrigerating chamber, external to the drum and mounted in fixed relation thereto and encircling the drum in closely spaced relation, the second chamber being constructed in much the same fashion as the revolving drum and formed from extruded arcuate sections, welded or otherwise secured together.

This external freezing chamber is formed in plural hinged parts which can be moved away from the drum for cleaning the latter, and also can be spaced closer or further from the periphery of the drum.

A further object of the invention is to provide an improved feed conveyor for applying the shrimp to the drum with a measure of pressure sufficient to temporarily adhere it thereto during the freezing cycle and thus provide a quick freezing operation which is fully automatic, trouble free, and rapid.

In the drawings:

FIG. 1 is an elevation showing one end of a rotary drum freezer embodying the present invention;

FIG. 2 is a side elevation thereof and taken on line 2—2 of FIG. 1;

FIG. 3 is a broken longitudinal section taken through the outer peripheral section of the drum;

FIG. 4 is a section taken on line 4—4 of FIG. 3;

FIG. 5 is a broken end elevation of the drum and outer freezing assemblies;

FIG. 6 is section taken on line 6—6 of FIG. 3;

FIG. 7 is an end elevation showing the freezing assemblies external to the drum in raised position.

The drum 10 is mounted for rotation on a frame including a plurality of vertical legs 11 supporting a platform 12 at their upper ends. A pair of bearings 14 are mounted on this platform and a shaft 16 is journalled at its ends in these bearings.

The drum is formed from a plurality of arcuate extrusions formed from any suitable metal. Because of its weight and because it is well suited for extrusion techniques, aluminum has given good results. The individual extruded sections have an outer convex surface 18 and an inner concave surface 19 and they may be about 12 inches in width and joined together as by welding to form the circular drum structure. Each section has a plurality of through passages 20 in parallel side by side relation separated by walls 21.

In FIG. 5, two of the extruded sections 22 and 24 are shown and their meeting faces 26 are secured together as by welding. Each section is of a length equal to the width of the drum which, as earlier stated, may be of the order of 72 inches. The ends of the passages 20 in the several sections forming the drum are closed by flat rings 28 which may be welded in place. A continuous back and forth passage in the drum is formed by cutting away the ends of alternate walls 21 as shown at 30 in FIG. 6. An inlet conduit 32 for the fluid refrigerant passes through end ring 28 and an outlet conduit (not shown) may be formed at the other end of the drum.

The shaft 16 is solid except that at each end an axial bore 33 is drilled and a rotary inlet coupling 34 is secured at one end of the shaft and a similar outlet coupling 36 is fitted at the opposite end thereof. These couplings are omitted in FIGS. 1 and 7. Couplings of this character for supplying fluid from a fixed conduit, shown here at 38, to a rotating member, and to a return conduit 39, are common in the art and the details of the fluid connections are, therefore, not illustrated. Suffice it to say that inlet conduit 32 leading to the interior of the drum is suitably connected to the rotating section of rotary joint 34.

In order to provide more efficient refrigerating action, there is an annular chamber adjacent inner surface 19 of the drum. This chamber is formed by a cylindrical ring 41 of sheet metal and spaced annular sides 42. The chamber is filled with insulation shown at 44. The drum is mounted for rotation by a plurality of radial spokes 46 secured at their inner ends to a hub 48 having an axial opening to receive shaft 16.

The drum may be driven by any suitable means such as a motor 49 shown in FIG. 1 and a belt 50 driving a pulley 51 fast on shaft 16. The drive will include a variable speed reducer since some foods become completely frozen faster than others. For instance, on a drum 6 feet in diameter, shrimp are frozen in about 18 minutes.

Outside the rotating drum are a pair of fixed arcuate freezing assemblies which are fabricated in the same manner as the drum, i.e., by extruded sections 57 whose inner faces 58 and outer face 59 form area of slightly larger circles than the sections used in the rotating drum and these sections have the same longitudinal channels 60 for the fluid refrigerant.

In actual practice, the sections of the same arcuate contour as the sections forming the drum may be used, by providing a slight spacing between the sections. An annular chamber is provided outside each freezing assembly and it includes a curved wall 62 and opposed end plates 64, the chamber being filled with insulation 66. The two curved assemblies are pivotally mounted by means of ears 67 which receive pivot pins 68 carried by a cross frame 69 supported above the rotating drum by diagonal frame member 70 extending upwardly from platform 12.

These assemblies may be lifted from their normal position of FIG. 1, where their inner faces are positioned about one inch from the outer annular face of the drum, to the raised position of FIG. 7 wherein this surface of the drum may be periodically cleaned.

If it is desired to provide means for varying the spacing of the outer freezing assemblies to the drum, the pivots 68 may pass through diagonal slots shown at 65 in FIG. 7, instead of holes.

The two outer freezing assemblies extend about 270° of the periphery of the drum and between their lower ends 74 and 75, a feed conveyor and also a discharge conveyor are positioned. The upper course of the latter is positioned above the former and the two are at right angles to each other. The feed conveyor includes an endless belt 77 to which the comestibles to be frozen are applied at the loading station and as they travel downstream they are pressed into firm contact with the drum. The belt is supported between two terminal rollers 79 and 80, one of which may be driven by any suitable means (not shown). Terminal roller 80 is mounted at a proper height on one of vertical frames 11 and roller 79 is mounted on separate vertical frame 82, spaced from the drum. The upper course of the conveyor belt is further supported between its ends on an idler roller 84 mounted on one of vertical frames 11. The lower face of the drum in the area of feed is positioned below a straight line drawn between roller 80 and idler roller 84 so that conveyor belt 77 presses the individual articles 85 against the drum, as shown in FIG. 4, with sufficient pressure and for a sufficient time so that they adhere when they leave point A (FIG. 4) and start their ascent during the freezing cycle. To accomplish the foregoing the tension on the belt is important and this tension is adjusted by means of an idler roller 86 engaging the belt on its lower course, said roller being carried on a shaft 87 which can be moved to an adjusted, fixed position relative to a slot 88 in a post 89.

The drum travels at a speed slow enough to complete the freezing during the 270° of rotation and the shrimp or other comestibles are then removed by a knife or breaker bar 91 whose sharp edge is in contact with the periphery of the freezing drum. The now frozen shrimp drop on a conveyer belt 92 disposed parallel to the axis of the drum and mounted for travel between pairs of upper and lower rollers 94 journalled on vertical frame members 95. The shrimp drop from the downstream end of the conveyer belt onto a chute 96 and into a receptacle 97.

It was earlier stated the outer periphery of the drum is a substantially perfect circle. This can be readily achieved by placing the assembled drum in a lathe and removing any surface irregularities. When so formed then, it is not necessary to have the breaker blade actually touch the surface of the drum, or if it does touch, the pressure can be very light and not enough to score the surface of the drum, should it be formed from aluminum.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. An apparatus for freezing unpackaged articles of solid food comprising a frame, a rotary freezing drum formed from a plurality of arcuate metallic sections joined together along their opposed edges to form the drum and having a plurality of passages therein, means connecting pairs of said passages at alternate ends, to provide a back-and-forth passage for a fluid refrigerant, a shaft on the frame supporting the drum for rotation, an endless conveyor belt below the lower periphery of the drum for feeding said article thereto, rollers supporting the belt and arranged to press the articles against the drum during limited travel with a measure of pressure and for sufficient time to cause them to adhere to the drum during a single revolution forming the freezing cycle, and a blade in substantial contact with the drum at the end of the cycle for removing the articles.

2. The structure of claim 1 and provided with a concave freezing assembly spaced from the outer peripheral face of the drum to hasten the freezing action and extending over an area less than the full periphery of the drum.

3. The structure of claim 2 wherein the outer freezing section is formed from arcuate sections with parallel passages therein.

4. The structure of claim 2 wherein said concave assembly is formed in two sections hinged at their upper ends on the frame.

5. The structure of claim 4 wherein the sections are pivoted adjacent the upper end of the frame, to allow the lower ends of the sections to be moved out of their freezing positions to permit cleaning of the outer peripheral surface of the drum.

6. The structure of claim 4 wherein both the drum and freezing assemblies have insulation on the faces opposite their freezing faces.

7. The structure of claim 1 wherein the means for pressing the articles against the drum include two of the rollers being positioned so that the outer periphery of the drum lies inside a line drawn between said rollers and means are provided for varying the length of the belt to decrease or increase said pressure.

References Cited

UNITED STATES PATENTS

| | | | |
|---|---|---|---|
| 3,410,108 | 11/1968 | Wentworth et al. | 62—341 |
| 1,806,490 | 5/1931 | Naumann | 62—346 |
| 1,965,617 | 7/1934 | Vogt | 62—346 X |
| 2,007,837 | 7/1935 | Rudd et al. | 62—346 X |
| 2,178,780 | 11/1939 | Doering | 165—91 |
| 2,493,149 | 1/1950 | Kirkpatrick | 62—346 X |

WILLIAM E. WAYNER, Primary Examiner

U.S. Cl. X.R.

62—341, 381; 165—91